March 21, 1939.  A. H. LAUDER ET AL  2,151,122

SYNCHRONOUS MACHINE CONTROL SYSTEM

Filed Jan. 29, 1937  2 Sheets-Sheet 1

Inventors:
Arthur H. Lauder,
Fred H. Winter,
by Harry E. Dunham
Their Attorney.

Patented Mar. 21, 1939

2,151,122

UNITED STATES PATENT OFFICE 2,151,122

SYNCHRONOUS MACHINE CONTROL SYSTEM

Arthur H. Lauder and Fred H. Winter, Schenectady, N. Y., assignors to General Electric Company, a corporation of New York Application January 29, 1937, Serial No. 122,936

9 Claims. (Cl. 172—289)

Our invention relates to control systems for synchronous machines and particularly to a system for controlling the application of excitation to the field winding of a synchronous machine so that it can synchronize its maximum possible load, and the object of our invention is to provide an improved synchronous machine field application control system of this type.

It has been shown quite conclusively by extended tests and calculations that a synchronous machine can synchronize its maximum possible load when excitation is applied to its field winding at substantially the point in the slip cycle of induced field current where the current passes through zero and starts to build up through the field winding in the same direction that the direct current exciting current is to flow through the field winding. Also, it has been found that substantially the same amount of load can be synchronized if the field winding is short-circuited at this same point and excitation is applied to the field winding shortly thereafter and before the machine has had time to pull out of synchronism.

In accordance with our invention, we provide an arrangement which functions when the machine attains the speed at which it is desired to synchronize the machine to complete a low resistance circuit across the field winding through suitable unidirectional current conducting means at a time when the induced field current is flowing in such a direction as not to flow through the unidirectional conducting means in order that during the next half-cycle of induced field current the field winding is short-circuited through this unidirectional conducting means. Also our arrangement functions to effect the application of excitation to the field winding immediately after the induced field current starts to flow through the unidirectional conducting means.

Figure 1:
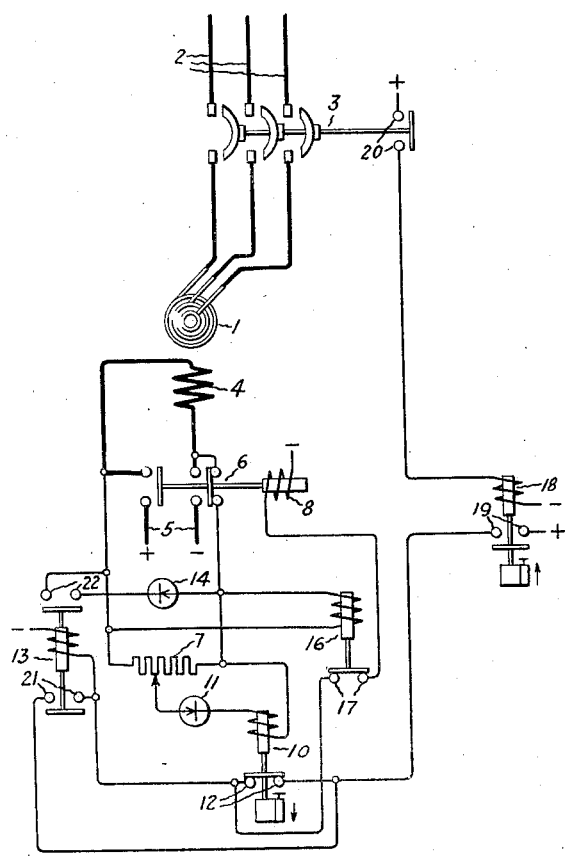
Figure 2:
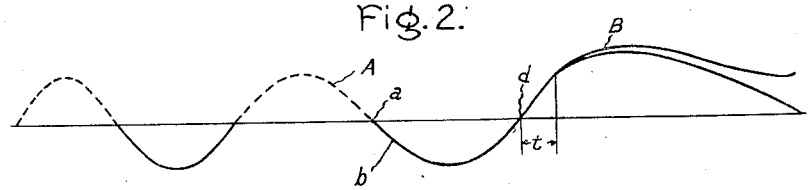
Figure 3:
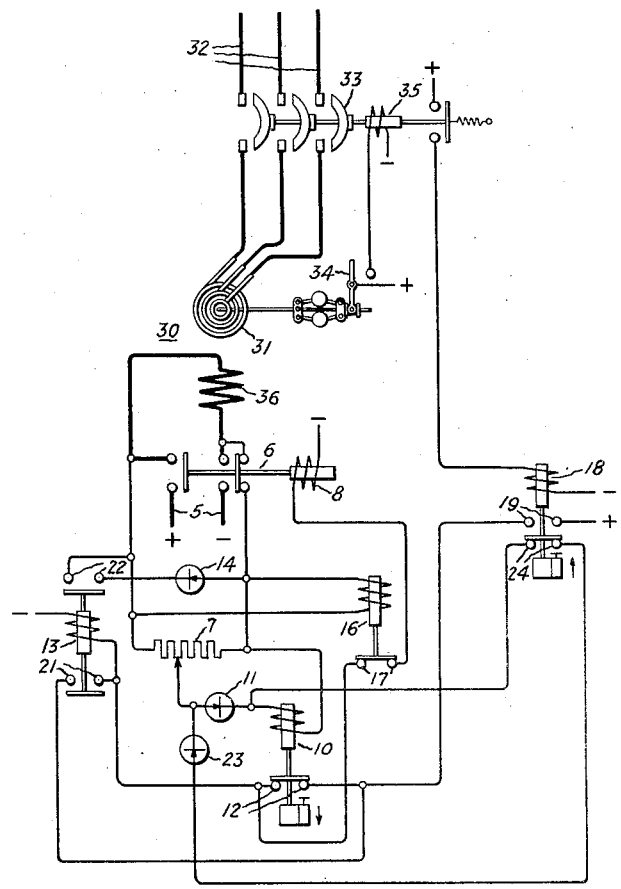

Our invention will be better understood from the following description when taken in connection with the accompanying drawings, Fig. 1 of which diagrammatically illustrates a synchronous motor starting system embodying our invention, Fig. 2 of which shows an explanatory curve, and Fig. 3 diagrammatically illustrates an automatic synchronizing system embodying our invention, and the scope of our invention will be pointed out in the appended claims.

Referring to Fig. 1 of the accompanying drawings, I represents a synchronous motor having an armature winding which is arranged to be connected to a suitable alternating current supply circuit 2 by means of a switch 3 which may be of any suitable type, examples of which are well-known in the art. While we have shown a manually controlled switch 3, it is obvious that any suitable automatic means may be employed for controlling the opening and closing of the switch. The motor I is also provided with a field winding 4 which is arranged to be connected to a suitable source of excitation 5 by means of a field switch 6. This switch 6, when open, is arranged to connect suitable impedance means such as a discharge resistor 7 across the terminals of the field winding 4.

The switch 6 is provided with an operating winding 8, which, when energized, moves the switch 6 from the position in which it is shown in the drawings to its other position, in which the source of excitation 5 is connected to the field winding 4.

For controlling the energization of the operating winding 8 of the switch 6 so that the field winding is excited at that point in the slip cycle which will produce the most favorable synchronizing operation, we employ the field application relay arrangement disclosed in United States Letters Patent 1,958,250, granted May 8, 1934, to Harold T. Seeley, assignor to the same assignee as this application. We have this field application relay arrangement complete around the discharge resistor 7 a low resistance shunt circuit, including a unidirectional current conducting device such as a half-wave rectifier, during that half-cycle of induced field current when this current is in such a direction as not to flow through the unidirectional current conducting device. Also, suitable means are provided for effecting the application of excitation to the motor field winding immediately after the induced field current starts to flow through the unidirectional current conducting means.

As disclosed in the drawings, the field application relay arrangement comprises a time relay 10 and a suitable unidirectional current conducting device, such as a half-wave rectifier 11, connected in series across a portion of the discharge resistor 7. With such an arrangement, the induced current which flows through the motor field winding 4 while the motor is operating below synchronous speed causes the relay 10 to pick up and remain in its picked-up position until the motor reaches a predetermined sub-synchronous speed, at which time the frequency of the induced field current becomes so low that the half-cycle during which no current flows through the winding of the time relay 10 is long enough to allow the relay to close its contacts 12 at the end of that half-cycle of slip frequency current. The closing of the contacts 12 completes an energizing circuit for a relay 13 which, when energized, completes a low impedance short-circuit around the discharge resistor 7 through a half-wave rectifier 14. This half-wave rectifier 14 is connected in such a manner that the half-wave of induced field current which flows through it is the opposite wave from the one which flows through the half-wave rectifier 11. Therefore, at this time, the low impedance short-circuit through the rectifier 14 is completed, the induced field current is not in a direction to flow through the rectifier 14. However, as soon as the induced field current starts to build up in the opposite direction it flows through this low resistance circuit.

In order to effect the closing of the field switch 6 as soon as possible after the current starts to flow through the rectifier 14, we connect across the discharge resistor 7 the winding of a relay 16, which is so designed that the normal voltage drop across the resistor 7 during the starting operation of the motor is sufficient to cause the relay 16 to maintain its contacts 17 open. However, when the discharge resistor 7 is short-circuited, the voltage drop across the resistor 7 drops to such a low value that the relay 16 immediately closes its contacts 17 and completes an energizing circuit for the closing coil 8 to operate the field switch 6 so that the field winding 4 is connected to the source of excitation 5.

In order to insure that the field switch 6 is not closed until after the motor 1 has started and the relay 10 has had time to open its contacts 12, we provide a relay 18 which has its contacts 19 connected in series with the contacts 12 of the relay 10 and the operating winding of the relay 13 and the closing coil 8 of the field switch 6. The circuit of the winding of relay 18 includes the auxiliary contacts 20 of the switch 3 so that the relay 18 is energized whenever the switch 3 is closed. The relay 18 is designed in any suitable manner so that it does not close its contacts 19 until after the winding of the relay has been energized for a predetermined time.

The operation of the arrangement shown in the drawings is as follows: When it is desired to start the motor 1, the switch 3 is closed so that the full voltage of the supply circuit 2 is applied to the armature winding of the motor to cause the motor to start from rest and accelerate to approximately synchronous speed. As soon as the motor armature winding is energized, a voltage of slip frequency is induced in the motor field winding 4 and this voltage causes a current of slip frequency to flow through the field winding 4 and the discharge resistor 7 and a pulsating current to flow through the half wave rectifier 11 and the winding of relay 10. The voltage drop produced across the discharge resistor 7 by this induced field current is sufficient to cause the relay 16 to open its contacts 17 and maintain them open. Until the motor reaches substantially synchronous speed the magnitude and the periodicity of the pulsating current through the winding of relay 10 are such that this relay picks up and maintains its contacts 12 open.

A short time after the switch 3 closes its contacts 20, the relay 18 closes its contacts 19 but in the meantime, the relay 10 has operated to open its contacts 12 so that the circuit of the winding of relay 13 is not completed at this time.

When the motor 1 reaches a predetermined subsynchronous speed, the frequency of the induced current through the field winding 4 and the resistor 7 becomes so low that the time interval of each half-cycle during which substantially no current flows through the winding of time relay 10 is long enough to allow the relay to return to its normally deenergized position and close its contacts 12. A circuit is then completed for the winding of relay 13 through the contacts 12 of relay 10 and the contacts 19 of relay 18. By closing its contacts 21, relay 13 completes a locking circuit for itself which is independent of the contacts 12 of relay 10 and by closing its contacts 22 the relay 13 completes, through the half-wave rectifier 14, a low impedance shunt circuit around the discharge resistor 7. However, the relay 13 completes this low impedance shunt circuit at a time when the current flowing through the field winding 4 is not in a direction to flow through the rectifier 14, but, as soon as the induced field current reaches zero and starts to build up in the opposite direction, most of the induced current flows through the rectifier 14 instead of the discharge resistor 7. This low impedance shunt circuit increases the time constant of the field circuit so that any change in the flux linkages existing at the instant the current starts to flow through the rectifier 14 is delayed for a sufficient length of time to allow the motor to pull into step. Also, the decrease in the voltage drop across the resistor 7 resulting from the closing of the contacts 22 causes the relay 16 to close its contacts 17 and complete through the contacts 21 of relay 13 and the contacts 19 of relay 18 an energizing circuit for the closing coil 8 of the field switch 6. The energization of the closing coil 8 operates the field switch 6 so that the source of excitation 5 is connected to the field winding 4.

Fig. 2 illustrates more clearly how our improved control arrangement effects the application of the field excitation to the motor field winding 4 at the most favorable point on the cycle of slip frequency current flowing through the field winding. In this Fig. 2, the curve A illustrates the current flowing through the field winding during the synchronizing operation. That portion of the curve to the left of the point $d$ illustrates the induced current of slip frequency which flows through the field winding as the motor reaches the predetermined subsynchronous speed from which it is desired to synchronize the motor. The solid portions of this part of curve A represents the half-waves of induced current during which current flows through the rectifier 11 and the winding of relay 10, and the dotted portions represent the half-waves of induced current during which no current flows through the winding of relay 10.

In this figure, $a$ represents the point where the relay 10 closes its contacts 12 and $b$ represents the point where the relay 13 closes its contacts 22 and completes the circuit through the half-wave rectifier 14. $d$ represents the point where the current starts to flow through the rectifier 14 after the relay 13 has operated. The solid portion of the curve A to the right of the point $d$ represents the induced field current through the field winding 4 after the current starts to flow through the rectifier 14, during which time the motor pulls into step. The curve B shows how the field current builds up in the field winding when the field switch 6 is closed. $t$ represents the time it takes the relay 16 and the field switch 6 to operate after the current starts to build up through the rectifier 14.

In Fig. 3, we have shown a synchronous generator synchronizing system embodying the field excitation control arrangement disclosed in Fig. 1. In this Fig. 3, 30 represents a synchronous generator which may be driven by any suitable prime mover (not shown). The armature winding 31 of the generator 30 is arranged to be connected to an energized alternating current circuit 32 by a suitable circuit breaker 33 when the generator speed is above a predetermined value. For accomplishing this result, we have shown a speed switch 34 which is responsive to the speed of the generator 30 and which is arranged to effect the completion of an energizing circuit for a closing coil 35 for the circuit breaker 33 when the speed of the generator is above a predetermined value. The generator 30 is provided with a field winding 36, the connections of which are shown as being controlled by the same field excitation control arrangement shown in Fig. 1, except that the relay 18 when in its deenergized position completes through its contacts 34 a shunt circuit around the half-wave rectifier 11. This shunt circuit includes a half-wave rectifier 23 which is connected in such a manner that both half-waves of the induced field current flow through the winding of the relay 10 in order to insure that the induced field current will pick up this relay 10 before the relay 18 operates.

The operation of the arrangement shown in Fig. 3 is as follows: When it is desired to place the generator 30 in operation the generator is started and brought up to a speed near synchronous speed by controlling the speed of the prime mover which drives the generator. During this operation the field winding 36 is short-circuited through the discharge resistor 7. When the motor reaches a predetermined speed near synchronous speed, the speed switch 34 operates to complete an energizing circuit for the closing coil 35 to effect the closing of the circuit breaker 33. The induced field current which flows through the field winding 36 as a result of the closing of the switch 33 causes the relay 10 and 17 to pick up. After the switch 33 has been closed for a predetermined time, the relay 18 operates to open the circuit through the half-wave rectifier 23 so that as soon as the generator reaches the speed from which it is desired to synchronize the generator the relay 10 drops out and completes the energizing circuit for the relay 13 to complete the short-circuit through the half-wave rectifier 14. The relay 16 then operates in the same manner as in Fig. 1 to effect the closing of the field switch 6.

While we have, in accordance with the patent statutes, shown and described our invention as applied to a particular system and as embodying various devices diagrammatically indicated, changes and modifications will be obvious to those skilled in the art, and we, therefore, aim in the appended claims to cover all such changes and modifications as fall within the true spirit and scope of our invention.

What we claim as new and desire to secure by Letters Patent of the United States is:

1. In combination, a synchronous machine having an armature winding and a field winding, impedance means connected in series with said field winding, means for supplying alternating current to said armature winding, unidirectional current conducting means, and means for completing around said impedance means a relatively low impedance shunt circuit including said unidirectional current conducting means during that portion of the cycle of induced field current when that current is in such a direction as not to flow through the unidirectional current conducting means.

2. In combination, a synchronous machine having an armature winding and a field winding, impedance means connected in series with said field winding, means for supplying alternating current to said armature winding, unidirectional current conducting means, means for completing around said impedance means a relatively low impedance shunt circuit including said unidirectional current conducting means during that portion of the cycle of induced field current when that current is in such a direction as not to flow through the unidirectional current conducting means, a source of excitation, and means for connecting said source to said field winding after said relatively low impedance circuit is completed.

3. In combination, a synchronous machine having an armature winding and a field winding, impedance means connected in series with said field winding, means for supplying alternating current to said armature winding, unidirectional current conducting means, means for completing around said impedance means a relatively low impedance shunt circuit including said unidirectional current conducting means during that portion of the cycle of induced field current when that current is in such a direction as not to flow through the unidirectional current conducting means, a source of excitation, and means controlled by the field current of said machine for connecting said source to said field winding after said relatively low impedance circuit is completed.

4. In combination, a synchronous machine having an armature winding and a field winding, impedance means connected in series with said field winding, means for supplying alternating current to said armature winding, unidirectional current conducting means, means for completing around said impedance means a relatively low impedance shunt circuit including said unidirectional current conducting means during that portion of the cycle of induced field current when that current is in such a direction as not to flow through the unidirectional current conducting means, a source of excitation, and means controlled by the voltage drop across said impedance means for connecting said source to said field winding after said relatively low impedance circuit is completed.

5. In combination, a synchronous machine having an armature winding and a field winding, impedance means connected in series with said field winding, means for supplying alternating current to said armature winding, unidirectional current conducting means, and means controlled by the induced field current for completing around said impedance means a relatively low impedance shunt circuit including said unidirectional current conducting means.

6. In combination, a synchronous machine having an armature winding and a field winding, impedance means connected in series with said field winding, means for supplying alternating current to said armature winding, unidirectional current conducting means, and means dependent upon a predetermined frequency and direction of flow of the induced field current for completing around said impedance means a relatively low impedance shunt circuit including said unidirectional current conducting means and at a time when the induced field current is in such a direction as not to flow through the unidirectional current conducting means.

7. In combination, a synchronous machine having an armature winding and a field winding, impedance means connected in series with said field winding, means for supplying alternating current to said armature winding, unidirectional current conducting means, means dependent upon a predetermined frequency and direction of flow of the induced field current for completing around said impedance means a relatively low impedance shunt circuit including said unidirectional current conducting means and at a time when the induced field current is in such a direction as not to flow through the unidirectional current conducting means, a source of excitation, and means for connecting said source to said field winding after said relatively low impedance circuit is completed.

8. An arrangement for pulling into step an unexcited synchronous machine which is operating as an induction machine comprising unidirectional current-conducting means normally disconnected from the field winding of the synchronous machine, and means controlled by a predetermined condition of said synchronous machine for effecting the completion of a circuit including said unidirectional current-conducting means and said field winding only during the half cycle of slip in which induced field current cannot flow through said unidirectional current-conducting means.

9. An arrangement for pulling into step an unexcited synchronous machine which is operating as an induction machine comprising unidirectional current-conducting means normally disconnected from the field winding of the synchronous machine, means controlled by the speed of said machine for effecting the completion of a circuit including said unidirectional current-conducting means and said field winding only during the half cycle of slip in which induced field current cannot flow through said unidirectional current-conducting means, and means for supplying direct current to said field winding after the circuit including said field winding and unidirectional current-conducting means has been completed.

ARTHUR H. LAUDER.
FRED H. WINTER.